United States Patent [19]
Brandinger et al.
[11] 3,828,121
[45] Aug. 6, 1974

[54] COLOR SIGNAL PRODUCING SYSTEM UTILIZING SPATIAL COLOR ENCODING AND COMB FILTERING

[75] Inventors: Jay Jerome Brandinger, Trenton; Dalton Harold Pritchard, Princeton, both of N.J.; Gordon Lyle Fredendall; Alfred Christian Schroeder, both of Southampton, Pa.

[73] Assignee: RCA Corporation, New York, N.Y.

[22] Filed: Feb. 11, 1970

[21] Appl. No.: 10,320

[52] U.S. Cl. .................................... 178/5.4 ST
[51] Int. Cl. .................................... H04n 9/06
[58] Field of Search ............ 178/5.4 ST; 350/162 SF

[56] References Cited

UNITED STATES PATENTS

| | | | |
|---|---|---|---|
| 3,378,633 | 4/1968 | Macovski | 178/5.4 ST |
| 3,470,310 | 8/1969 | Shashoua | 350/148 |
| 3,585,286 | 6/1971 | Macovski | 178/5.4 ST |
| 3,647,943 | 3/1972 | Marshall | 178/5.4 ST |

*Primary Examiner*—Robert L. Griffin
*Assistant Examiner*—George G. Stellar
*Attorney, Agent, or Firm*—E. M. Whitacre; William H. Meagher

[57] ABSTRACT

Colored light from a scene is spatially encoded onto a photosensitive surface by a striped spatial color encoding filter assembly including first and second superimposed encoding gratings having equal pitch encoding stripes disposed such that the stripes of the respective gratings are at substantially equal and opposite angles measured from a reference line in the plane of the filter. Scanning of the encoded image on the photosensitive surface produces a composite signal including first and second carrier wave components representative of first and second colors and having substantially the same frequency during a scanning interval. The carrier wave components are separated by comb filter apparatus for producing separate color representative signals.

14 Claims, 17 Drawing Figures

INVENTORS
JAY J. BRANDINGER
DALTON H. PRITCHARD
GORDON L. FREDENDALL
ALFRED C. SCHROEDER

BY Eugene M. Whitacre
ATTORNEY

INVENTORS
JAY J. BRANDINGER
DALTON H. PRITCHARD
GORDON L. FREDENDALL
ALFRED C. SCHROEDER
BY Eugene M. Whitacre
ATTORNEY INVENTORS
JAY J. BRANDINGER
DALTON H. PRITCHARD
GORDON L. FREDENDALL
ALFRED C. SCHROEDER
BY Eugene M. Whitacre
ATTORNEY INVENTORS
JAY J. BRANDINGER
DALTON H. PRITCHARD
GORDON L. FREDENDALL
ALFRED C. SCHROEDER
BY Eugene M. Whitacre
ATTORNEY

COLOR SIGNAL PRODUCING SYSTEM UTILIZING SPATIAL COLOR ENCODING AND COMB FILTERING

BACKGROUND OF THE INVENTION

This invention relates to a color encoding system and to apparatus utilizing a comb filter for producing color representative signals.

It is known that a striped spatial color encoding filter may be utilized to encode a plurality of colors onto a photosensitive surface such as a black and white film in a film camera or a photosensitive electrode of an image pickup device in a television camera. Color encoding techniques utilized in a television camera permit a plurality of color signals to be obtained from a single image pickup device, thereby eliminating the need for a separate pickup device for producing each different color representative signal. Thus, the use of color encoding in a television camera reduces its cost, size and complexity.

One method of encoding colors is to utilize an encoding filter assembly comprising a first grating of alternate cyan and transparent strips for encoding red light as amplitude modulation of a first carrier wave and a second grating superimposed over the first grating comprising alternate transparent and yellow strips for encoding blue light as amplitude modulation of a second carrier wave. The gratings may have the same spatial frequency, i.e., the same line density of stripes in a direction normal to the direction of the stripes, with one of the gratings angularly disposed relative to the direction of the scanning lines such that when the imaged stripe pattern on the photosensitive electrode is scanned by an electron beam the red and blue color representative carrier waves thereby produced have different frequencies. Thus, the carrier waves may be separately bandpass filtered and detected for producing separate red and blue color representative signals. The overall transmissivity of the filter stripes may be selected such that a brightness representative signal is contained in the average transmission of the filter. This brightness signal may be bandpass limited to approximately 3 MHz. The stripe pitch and angle of inclination of the stripes of each grating relative to the scanning direction may be selected such that the red carrier wave is at 3.5 MHz and the blue carrier wave is at 5 MHz, with a 500 KHz bandwidth allotted for the color sideband information of each color carrier wave. It can be seen that with a 3 MHz luminance signal the required frequency spectrum must extend to 5.5 MHz to include the brightness signal and two color carrier waves and their associated sidebands. The 5.5 MHz bandwidth requirement is such that it approaches the limit of the useful frequency response of available image pickup devices such as vidicon camera tubes. In addition, problems may be encountered in that the gamma characteristics of the pickup device for the relatively widely separated frequency of the color carrier waves will be different, and the separate color carrier waves may not track each other with changes in scene illumination, causing colorimetric errors.

Another method of encoding colors utilizing a stripe filter to encode the light reaching the photosensitive electrode of an image pickup tube is to phase modulate a carrier wave periodically with different color information. In such a method several colors modulate different phases of a color carrier wave. A major problem encountered in a color encoding system utilizing phase modulation of a carrier wave is that nonlinearity of the optical system and the scanning system make it essential that a reference wave accompany the color information through the system in order to be available for use in demodulation of the phase modulated carrier wave because slight deviation of the phase between the signal and reference waves results in erroneous color signals being produced by the demodulation circuits. Various methods have been proposed for providing this reference wave such as, for example, a reference grating superimposed over the color encoding grating such that scanning of the imaged encoding filter pattern and grating pattern produces a reference wave component in the composite signal derived from the image pickup tube during scanning. This method has a disadvantage in that the reference grating blocks illumination and results in lower efficiency of light transmission by the optical apparatus. Phase modulated systems in general have a main disadvantage in that even a slight undesirable phase change of the reference wave with respect to the phase modulated color carrier wave results in erroneous color signals being generated.

Thus, while it is desirable to amplitude modulate a carrier wave with color information because of the insensitivity of the amplitude modulated color wave to phase changes brought about by system nonlinearity, it has been necessary to utilize separate spectral regions for this, resulting in an undesirably narrow-banded luminance signal in order to include even two relatively narrow-band color signals. Further, while some phase modulated color carriers can provide full color information in a smaller spectral range than an amplitude modulation system, the phase modulated carrier system is unsatisfactory in that it is susceptible to phase changes caused by system nonlinearity.

A system for overcoming the disadvantages of prior art color encoding techniques is described in copending application Ser. No. 10,323, entitled *Color Encoding Camera Utilizing Comb Filtering For Color Signal Separation*, filed concurrently herewith by Robert A. Dischert. The Dischert application describes an encoding system including a color encoding filter assembly for encoding a plurality of color onto a photosensitive surface and comb filter apparatus for separating the plurality of color representative signals produced as the photosensitive surface is scanned. This system enables a plurality of color representative carrier waves to be contained within a common range of frequencies, thereby reducing the total bandwidth required for producing a plurality of color signals and a brightness representative signal.

One problem encountered in all color encoding systems utilizing striped spatial color encoding filter gratings have different spatial frequencies is that the different grating structures cannot be resolved equally by a single electron beam having a given spot size. This situation results in nonuniformity of colors appearing in different portions of the scanned raster. Relatively complicated circuitry is required to correct for color nonuniformity. Further, to reduce the amount of color nonuniformity the image pickup device used in conjunction with the color encoding filter is selected for having optimum spot uniformity across the raster. This necessitates either the selection of only a few of many available relatively low-cost pickup devices or the use of a higher quality, higher cost image pickup device.

Accordingly, it is an object of this invention to provide a color encoding system for producing a plurality of color representative signals contained within a minimum bandwidth and which system imposes minimum requirements on beam spot uniformity for producing uniform color representative signals as an image of the encoded signals is scanned.

Another object of this invention is to provide a color encoding system utilizing a striped spatial color encoding filter assembly and comb filter apparatus for separating color representative carrier wave components produced by scanning an image of the encoding stripe pattern modulated by scene light, the comb filter apparatus providing maximum separation of carrier wave components in the presence of scanning nonlinearity.

A color encoding system is provided for encoding a plurality of colors. A striped spatial color encoding filter assembly is disposed in an optical path to spatially separate different colored light passing therethrough and impinging on a photosensitive surface. The filter assembly includes first and second superimposed encoding gratings having the same spatial frequency and disposed at substantially equal and opposite angles from the direction of scanning of the photosensitive surface. Scanning of the encoding stripe pattern modulated by scene light imaged onto the photosensitive surface produces a composite signal including first and second amplitude modulated carrier wave components representative of the first and second colors and having substantially the same frequency during a scanning interval.

In one embodiment of the invention comb filter apparatus is provided in combination with the encoding system for combining the signals obtained from a plurality of successively scanned lines and for separating the color representative carrier waves for producing separate color representative signals.

In another embodiment of the invention comb filter apparatus is provided in combination with the encoding system, the comb filter apparatus including means for obtaining a plurality of color representative carrier wave components having maximum separation from each other in the presence of scanning nonlinearity.

A more detailed description of the invention is given in the following specification and accompanying drawings of which:

FIG. 1 is a block diagram of an embodiment of the invention of a system for producing color representative signals;

FIGS. 2*a* 2*b* and 2*c* are diagrams representative of a color encoding filter assembly utilized in the system shown in FIG. 1, and waveforms obtained at various points in the system shown in FIG. 1;

DESCRIPTION OF THE INVENTION

Figure 1:
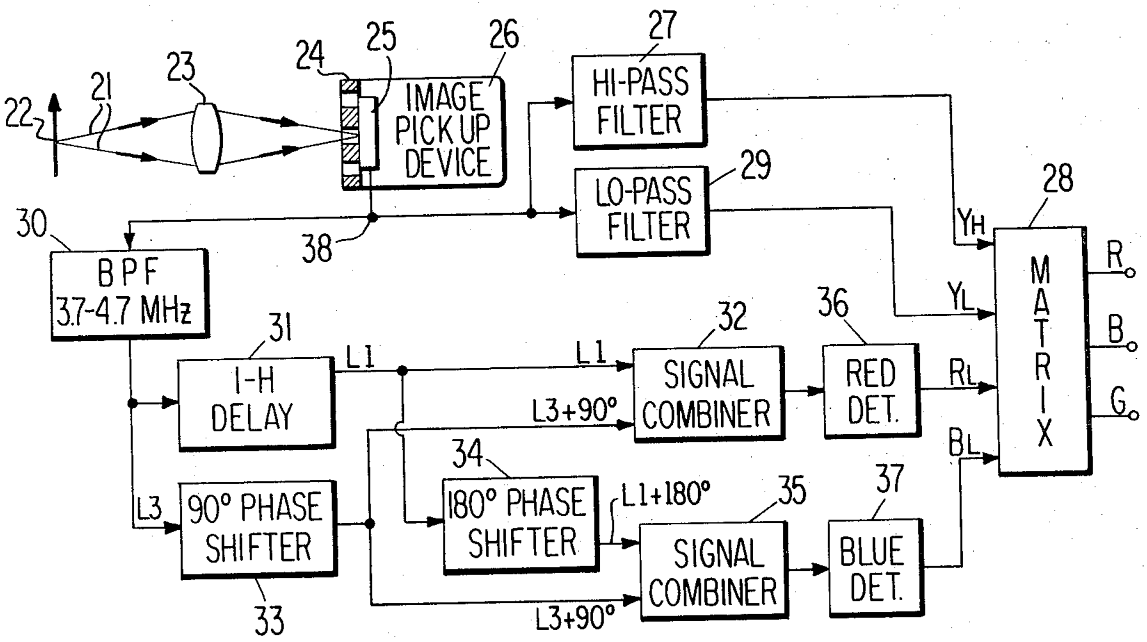

FIG. 1 is a block diagram of an embodiment of the invention of a system for producing color representative signals. Light rays 21 from an object 22 are directed by an objective lens 23 through a color encoding filter assembly 24 to a photosensitive electrode 25 of an image pickup device 26. Image pickup device 26 may be a vidicon, for example, operated in a conventional manner and having its electron beam scanned over photosensitive electrode 25 at conventional television field and line scanning rates. Color encoding filter assembly 24 may be disposed inside the vidicon adjacent the photosensitive electrode 25, outside the vidicon adjacent the faceplate or at some intermediate point in the optical path between objective lens 23 and photosensitive electrode 25. One essential requirement of color encoding filter assembly 24 is that it spatially separates the different colored light directed towards photosensitive electrode 25. Encoding filter assembly 24 comprises two superimposed gratings for encoding two different colors, the transmissivity of both gratings being selected such that a brightness representative signal is contained in the average light transmission of the filter assembly. Color encoding filter assembly 24 will be described in more detail subsequently in conjunction with FIGS. 2*a*, 2*b* and 2*c*.

As the electron beam of image pickup device 26 is scanned over the photosensitive electrode 25 a composite signal including brightness information and encoded color information of the object 12 is obtained from an output terminal 38. This composite signal is coupled to high pass filter 27 and a low pass filter 29 which separate the high and low frequency components, respectively, of the brightness representative signal. The bandwidth of low pass filter 29 extends from 0 to 500 KHz, its bandwidth matching the sideband bandwidth of the color signal to be described subsequently. The bandwidth of high pass filter 27 is from approximately 500 KHz to 3.7 MHz, the upper frequency being the lower limit of the bandpassed color signal spectrum. The high frequency brightness components ($Y_H$) obtained from high pass filter 27 and the low frequency components ($Y_L$) of the brightness signal obtained from low pass filter 29 are coupled to a matrix 28.

The composite signal obtained from terminal 38 is also coupled to a bandpass filter 30 for separating the color representative components from the brightness representative signal components. Bandpass filter 30 has a center frequency of 4.2 MHz and sidebands of 500 KHz. 4.2 MHz is the frequency of the color representative carrier waves produced by scanning the encoded light pattern on photosensitive electrode 25. The carrier wave components obtained from bandpass filter 30 are coupled to a 1-H delay 31 which has a delay equal to one horizontal scanning line interval, which is approximately 63.5 microseconds in the United States. The color representative carrier wave components obtained from bandpass filter 30 are also coupled to a 90° phase shifter 33. Phase shifter 33 may be any suitable apparatus which will provide a delay equal to 90° of a 4.2 MHz carrier wave to all signals coupled to it. The phase shifted components are coupled to a signal combiner 32 and to a signal combiner 35. The delayed wave components obtained from 1-H delay 31 are coupled to signal combiner 32 and to a 180° phase shifter 34. Phase shifter 34 may be any suitable apparatus providing a polarity reversal or a delay equal to 180° of a 4.2 MHz carrier wave to all signals coupled to it. The bandwidth of phase shifters 33 and 34 is compatible with the bandwidth of bandpass filter 30. The phase shifted carrier wave components obtained from phase shifter 34 are coupled to signal combiner 35. The signal obtained from signal combiner 35 is coupled to a blue color representative amplitude detector 37. The detected blue color representative signal ($B_L$) having a bandwidth of 500 KHz is coupled to matrix 28. The signal obtained from signal combiner 32 is coupled to a red color representative amplitude detector 36. The detected red representative color signl ($R_L$) having a bandwidth of 500 KHz is coupled to matrix 28.

Matrix 28 is any suitable matrix employing conventional means for combining the $Y_H$, $Y_L$, $R_L$ and $B_L$ signals for forming red (R), blue (B) and green (G) color representative signals. These latter signals obtained from matrix 28 are suitable for application to a conventional color television signal encoder.

Figure 2A:
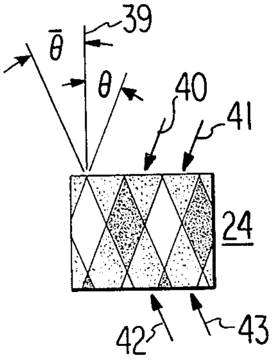
Figure 2B:
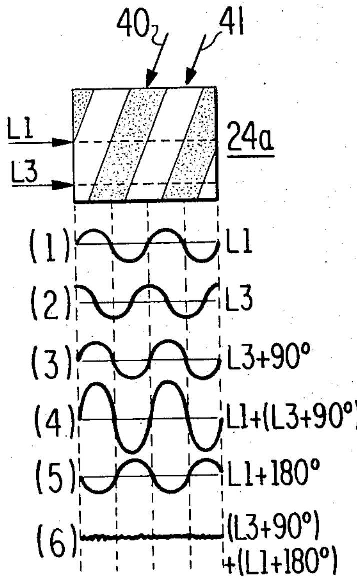
Figure 2C:
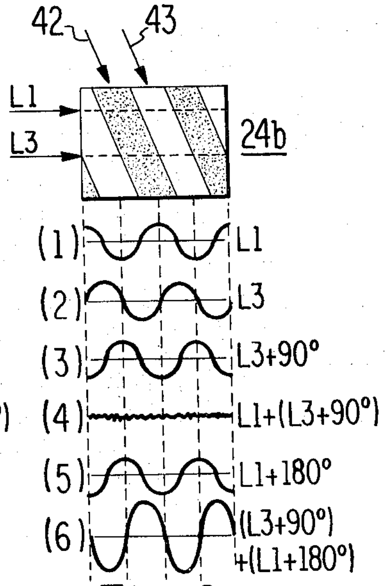

FIGS. 2*a*, 2*b* and 2*c* are diagrams representative of a color encoding filter assembly utilized in the system shown in FIG. 1; FIGS. 2*b* and 2*c* include waveforms obtained at various points in the system shown in FIG. 1. FIG. 2*a* shows a striped spatial color encoding filter assembly 24 comprising a first grating having alternate cyan stripes 40 and transparent stripes 41. Cyan stripes 40 block red light and pass light of all other colors and transparent stripes 41 pass light of all colors. Therefore, the signal obtained by scanning the imaged pattern produced by cyan and transparent stripes 40 and 41 is a carrier wave component amplitude modulated by the amount of red light present in the scene. The red encoding grating of filter 24 is superimposed over a second encoding grating having alternate yellow stripes 42 and transparent stripes 43. Yellow stripes 42 block blue light and pass light of all other colors and transparent stripes 43 pass light of all colors. The signal obtained by scanning the imaged encoding pattern produced by yellow and transparent stripes 42 and 43 is a carrier wave component amplitude modulated by the amount of blue light present in the scene. The pitch of a cyan-transparent stripe pair 40–41 is the same as the pitch of a yellow-transparent stripe pair 42–43. Thus the red and blue encoding gratings have the same spatial frequency which results in the two grating patterns being equally resolved by an electron beam having a given spot size. This results in uniform color being produced over the entire scanned raster.

The cyan-transparent stripe pairs 40–41 are disposed at an angle $\theta$ from a reference line 39. The yellow transparent stripe pairs 42–43 are disposed at an angle $\overline{\theta}$ extending in the opposite direction from reference line 39. Reference line 39 is normal to the direction of scanning. Angles $\theta$ and $\overline{\theta}$ are equal and opposite angles. The red and blue encoding gratings, having equal pitches of their respective stripe pairs and having their respective stripe pairs disposed at equal and opposite angles from the common reference line, result in red and blue representative carrier wave components being produced during scanning, which waves have the same frequency during any scanning line interval.

In the embodiment shown in FIG. 1 the stripe pitch of the red and blue encoding gratings is selected such that the red and blue color carrier waves have a center frequency of 4.2 MHz. The angles $\theta$ and $\overline{\theta}$ are selected such that the red and blue carrier waves each undergo a 90° phase shift from one scanning line to the next scanned line. Since the stripes of the red and blue gratings are inclined at opposite angles the phase change of the red and blue carriers are in opposite direction from one scanning line to the next. Therefore, the phase difference between the red and blue carrier wave components from one scanning line to the next is 180°. The composite signal obtained from terminal 38 of FIG. 1 includes the brightness representative signal previously described and the red and blue color carrier wave components and their associated sidebands. Bandpass filter 30 separates the color carrier wave components and their upper and lower 500 KHz sidebands from the brightness signal components.

Comb filter apparatus is used to separate the color carrier wave components from each other. In FIG. 1 the comb filter comprises delay 31, signal combiner 32, phase shifter 33, phase shifter 34 and signal combiner 35. The operation of this comb filter apparatus will be described in conjunction with FIGS. 2*b* and 2*c* and their associated waveforms.

FIG. 2*b* is a diagram representative of a red encoding grating **24*a* utilized in color encoding filter assembly 24, and waveforms obtained at various points in the system shown in FIG. 1, which signals are produced by scanning an image of encoding grating 24*a*. Encoding grating 24*a* comprises a pattern of alternate cyan stripes 40 and transparent stripes 41. Scanning lines L1 and L3, indicated by dotted lines extending across the surface of encoding grating 24*a*** represent two successively scanned lines during a television field. FIG. 2*b*(1) is a waveform obtained from 1-H delay 31. This waveform has been delayed for one scanning line. FIG. 2*b*(2) is a waveform obtained during a next successive scanning interval L3 and is obtained from bandpass filter 30. The waveform of FIG. 2*b*(2) is phase shifted 90° with respect to the waveform of FIG. 2*b*(1). This phase shift is produced by scanning the stripe pairs 40–41 which are inclined at an angle to the direction of scanning lines L1 and L3. Because the signal generated during scanning interval L1 has been delayed for one scanning interval by 1–H delay 31 it is in time coincidence with the undelayed signal obtained during scanning interval L3. FIG. 2*b*(3) is a waveform obtained from 90° phase shifter 33. This waveform and the waveform of FIG. 2*b*(1) are coupled to signal combiner 32. The waveform obtained from signal combiner is shown in FIG. 2*b*(4). This waveform represents the sum of the waveforms shown in FIG. 2*b*(1) and 2*b*(3). Since these waveforms are in phase they add, thus producing a red color representative carrier wave and sidebands at the output terminal of signal combiner 32 and a red representative amplitude demodulated signal at the output terminal of red signal detector 36.

The signal obtained from 1–H delay 31 is also coupled to phase shifter 34 which delays the signal by 180°. The waveform obtained from phase shifter 34 is coupled to signal combiner 35 and is shown in FIG. 2*b*(5). The signal obtained from 90° phase shifter 33 is also coupled to signal combiner 35. The signal obtained from signal combiner 35 is the sum of waveforms shown in FIG. 2*b*(3) and 2*b*(5). These waveforms, being 180° out of phase, cancel, and the resultant signal is shown in FIG. 2*b*(6). Thus, the operation of the comb filter is such that in the presence of red scene light a red representative signal will be obtained only from red signal detector 36 and not from blue signal detector 37.

FIG. 2*c* is a diagram representing a blue color encoding grating **24*b* utilized in encoding filter assembly 24. Encoding grating 24*b* comprises alternate yellow stripes 42 and transparent stripes 43.** FIG. 2*c* also shows waveforms obtained by scanning the imaged pattern produced by blue encoding grating **24*b*.** FIG. 2*c*(1) shows a waveform obtained from 1–H delay 31, which waveform has been delayed for one scanning interval. FIG. 2*c*(2) shows a waveform generated during a next succeeding scanning interval L3. The waveform shown in FIG. 2*c*(1), having been delayed for one scanning interval, is in time coincidence with waveform 2*c*(2). FIG. 2*c*(3) shows a waveform obtained from 90° phase shifter 33, which waveform has been delayed an amount equal to 90° of a carrier wave at 4.2 MHz. The waveforms shown in FIGS. 2*c*(1) and 2*c*(3) are coupled to signal combiner 32. The waveform obtained from signal combiner 32 is the sum of waveforms 2*c*(1) and 2*c*(3). These waveforms, being 180° out of phase, cancel to produce a resultant waveform equal to zero. This blue representative carrier wave is shown in FIG. 2*c*(4).

The waveform obtained from 1–H delay 31 is coupled to phase shifter 34 which delays the waveform an amount equal to 180° of a carrier wave at 4.2 MHz. This phase shifted waveform is coupled to signal combiner 35 and is shown in FIG. 2*c*(5). The signal obtained from signal combiner 35 is the sum of waveforms 2*c*(3) and 2*c*(5). These waveforms, being in phase, add, thereby producing a resultant blue color representative carrier wave at the output terminal of signal combiner 35. Therefore, a demodulated blue color representative signal is obtained from blue signal detector 37 and is coupled to matrix 28. Thus, in the presence of blue scene light a blue representative signal will be obtained only from blue signal detector 37 and not from red signal detector 36. In this manner the comb filter apparatus operates to separate carrier waves having the same frequency during a scanning interval, which carrier waves are representative of red and blue colors in the scene.

Figure 3:
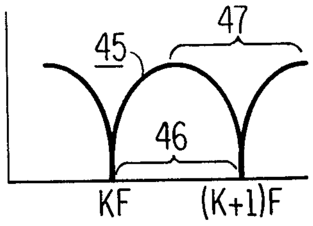
FIG. 3 is a curve representing the response of the comb filter apparatus shown in FIG. 1.

FIG. 3 is a curve representing the response of comb filter apparatus shown in FIG. 1. The curve 45 has periodic nulls 46 separated by periodic peaks 47. The separation between adjacent peaks or nulls is equal to the horizontal line scanning frequency or approximately 15,734 cycles per second in the United States. Thus, adjacent nulls are designated by the factor KF and (K+1)F, in which K represents some number not necessarily an integer and F represents the horizontal line scanning frequency. The comb filter response represented by curve 45 extends in the frequency spectrum above and below the center frequency of the carrier, which is 4.2 MHz in the embodiment shown in FIG. 1. It should be noted that by altering the pitch of the encoding stripes and the amount of delay of phase shifters 33 and 34 of FIG. 1, the comb filter can be made to operate at other desired frequencies.

Figure 4:
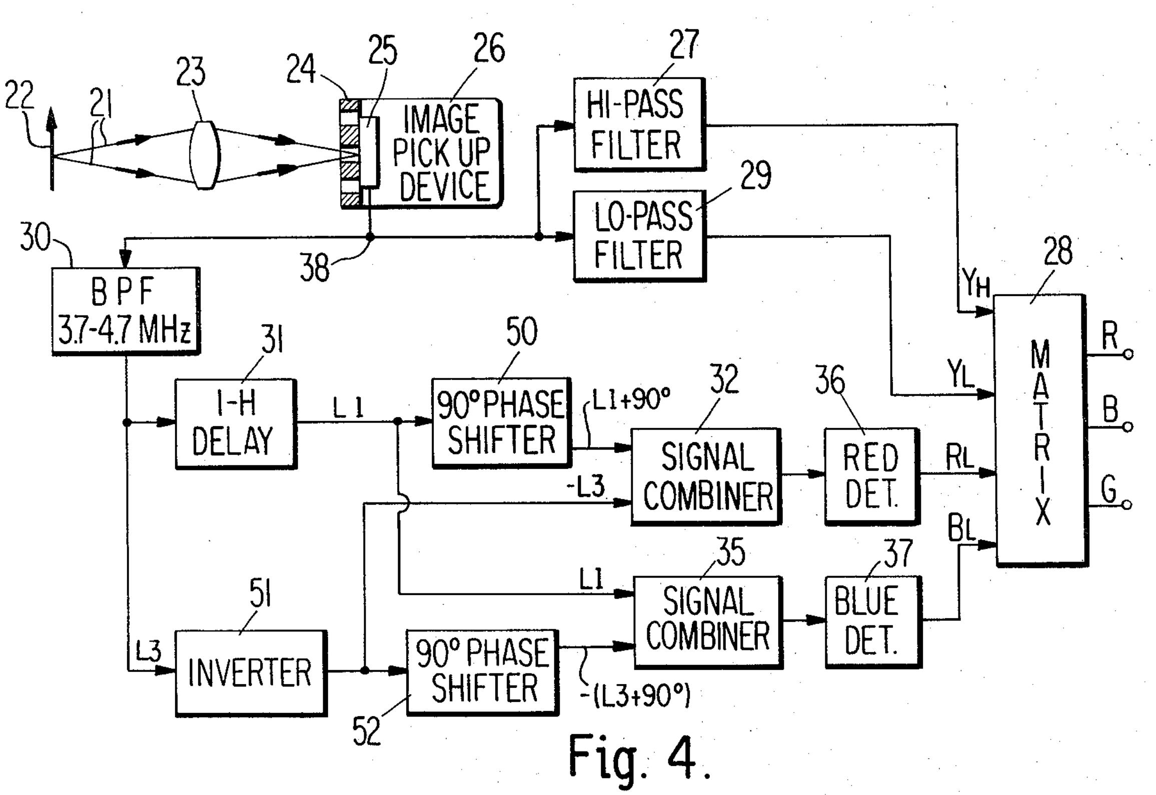
FIG. 4 is a block diagram of another embodiment of the invention of a system for producing color representative signals.

FIG. 4 is a block diagram of another embodiment of the invention of a system for producing color representative signals. Those blocks in FIG. 4 which perform similar functions to the corresponding blocks of FIG. 1 are labeled the same as in FIG. 1 and a detailed description of them will not be given in conjunction with FIG. 4.

The embodiment shown in FIG. 4 differs from that shown in FIG. 1 in that an improved comb filter is utilized which comb filter provides better separation of the different color representative carrier waves in the presence of system nonlinearity. The color carrier wave components obtained from terminal 38 will have a constant center frequency of 4.2 MHz during any scanning line only when there is no optical distortion in the system and when the scanning beam is linear throughout the raster. This perfect condition is difficult to achieve with a low-cost system. Therefore, in most systems nonlinearity will be present and hence the center frequency of the color carrier produced by scanning the encoded light pattern on the photosensitive electrode will vary at different points in the scanned raster. The effect of system nonlinearity and the resultant carrier shift in the system shown in FIG. 1 effectively moves the carrier with respect to the null points of the curve shown in FIG. 3 and it therefore will not be separated as much from the peak response points of the comb filter. Thus, optimum color carrier separation will not be realized.

Referring again to FIG. 4, the color carrier wave components obtained from bandpass filter 30 are coupled to a 1–H delay 21 and an inverter 51. Inverter 51 serves to invert the polarity of all signal components applied to it and not just the components at the center frequency carrier of 4.2 MHz. The inverted signal obtained from inverter 51 is coupled to a signal combiner 32 and also to a 90° phase shifter 52. The signal obtained from phase shifter 52 is coupled to a signal combiner 35. Thus, of the two carrier wave components applied to each of signal combiners 32 and 35 one is a component which has been inverted by inverter 51. Therefore, in the combining of the color carrier wave components by each of signal combiners 32 and 33 one component will be inverted with respect to the other so that in the presence of nonlinearity, subtraction of the signal will result in maximum separation of the carrier wave components.

Figure 5:
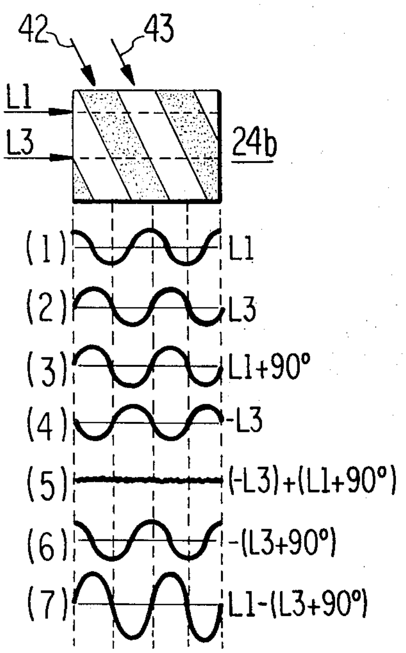
FIG. 5 is a diagram representative of a color encoding filter assembly utilized in the system shown in FIG. 4, and waveforms obtained at various points in the system shown in FIG. 4.

The operation of the system shown in FIG. 4 will be described in conjunction with FIG. 5. FIG. 5 is a diagram representative of a blue color encoding grating 24*b* utilized in color encoding filter assembly 24 of FIG. 4. Encoding grating 24*b* is similar to the corresponding grating described in conjunction with FIGS. 1, 2*a*, 2*b* and 2*c*. Therefore, only the operation of the system shown in FIG. 4 in response to the signals produced by scanning the encoded pattern of blue encoding grating 24*b* will be described. It is understood that the operation of the system for the red encoding grating is similar.

FIG. 5(1) shows a waveform obtained from 1–H delay 21. This waveform has been delayed for one horizontal line scanning interval. This waveform is coupled to a 90° phase shifter 50 and signal combiner 35. FIG. 5(2) shows a waveform obtained during a scanning interval L3 from bandpass filter 30 as described in conjunction with FIGS. 2*a*, 2*b* and 2*c*. The waveform obtained during scanning interval L3 is phase shifted 90° with respect to the waveform obtained from 1–H delay 31. The waveform 5(1) is coupled to a 90° phase shifter 50 which delays it an amount equal to 90° of a 4.2 MHz carrier wave. This phase shifted waveform shown in FIG. 5(3) is coupled to signal combiner 32. The waveform obtained from inverter 51 is shown in FIG. 5(4). This waveform is coupled to signal combiner 32. Signal combiner 32 combines waveforms 5(3) and 5(4). The resultant waveform obtained from signal combiner 32 is shown in FIG. 5(5) and is equal to the sum of waveforms 5(3) and 5(4). These waveforms, being 180° out of phase, cancel, and no resultant blue representative signal is coupled to red detector 36.

The waveform obtained from inverter 51 is coupled to a 90° phase shifter 52 which delays the phase of that signal an amount equal to 90° of a 4.2 MHz carrier wave. This waveform obtained from phase shifter 52 is shown in FIG. 5(6). This waveform is coupled to signal combiner 35. Thus, signal combiner 35 combines waveforms 5(1) and 5(6). The resultant of these signals is their sum since the two signals are in phase. This blue representative carrier wave is shown in FIG. 5(7). Thus, in the presence of blue light there is a blue color representative carrier and sidebands obtained from signal combiner 35 and a blue representative amplitude demodulated signal obtained from blue signal detector 37. The operation of the system for red representative signals is similar to that described for the blue, but red color representative signals will be obtained only from red signal detector 36 and not from blue signal detector 37. Matrix 28 combines the red and blue low frequency components $R_L$ and $B_L$ with the brightness representative signal components $Y_H$ and $Y_L$ for producing separate red, blue and green color resresentative signals.

Figure 6:
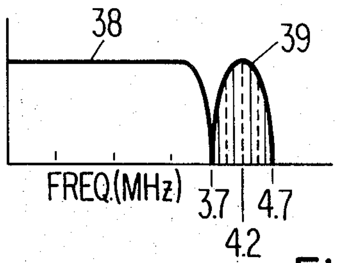
FIG. 6 is a diagram representative of the color and brightness signal spectrum utilized in the systems shown in FIGS. 1, 4 and 7.
Figure 7:
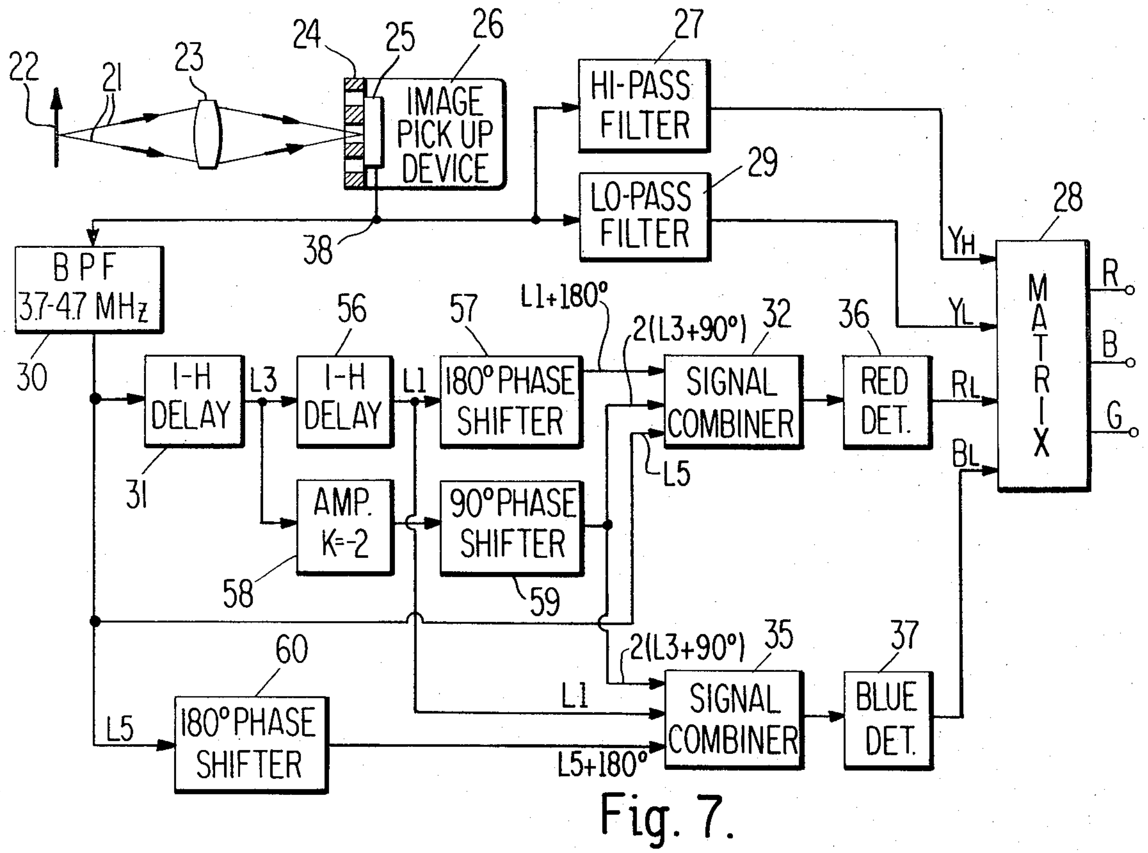
FIG. 7 is a block diagram of another embodiment of the invention of a system for producing color representative signals.

FIG. 6 is a diagram representative of the spectrum of the brightness and color representative signals produced by the systems shown in FIGS. 1, 4 and 7. In FIG. 6 a curve 38 represents the combined low and high frequency brightness representative signals. These signals occupy the spectrum from 0 to 3.7 MHz. The curve 39 represents the spectrum occupied by both the blue and red representative carrier wave components. This spectrum extends from 3.7 MHz to 4.7 MHz, centered around 4.2 MHz. The dotted and solid lines contained within curve 39 represent the interleaved sideband components of the red and blue representative carrier wave components. The effect of the red and blue color carrier waves undergoing a 180° phase shift in relation to each other from one scanning line to the other results in the color carrier sidebands being effectively spaced from each other by one half of 15.734 KHz. Thus, the separate red and blue color representative carrier waves and their associated sidebands are said to be interleaved. The comb filter apparatus of FIGS. 1 and 4 operate to separate the interleaved red and blue color signals in the manner described above, enabling a relatively wideband brightness signal providing good scene detail to be produced because the two amplitude modulated color carrier signals are interleaved in the same spectrum required to contain a single color signal in prior art arrangements.

FIG. 7 is a block diagram of another embodiment of the invention of a system for producing color representative signals. The embodiment shown in FIG. 7 differs from the embodiments shown in FIGS. 1 and 4 in that the comb filter apparatus shown in FIG. 7 is improved over the comb filter apparatus shown in FIGS. 1 and 4. Specifically, the response of the comb filter apparatus of FIG. 7 is as shown in FIG. 9.

Figure 9:
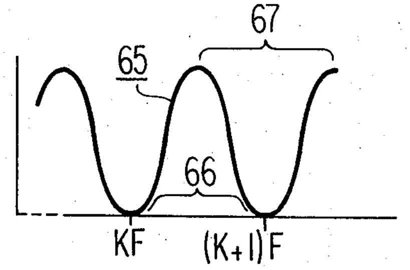
FIG. 9 shows a curve representative of the comb filter response of the system shown in FIG. 7.

FIG. 9 shows a curve 65 representative of the comb filter response, having periodic nulls 66 and periodic peaks 67. Adjacent nulls or peaks are separated from each other by the horizontal line scanning frequency as described in conjunction with FIG. 3. By comparing the respective curves shown in FIGS. 3 and 9 it can be seen that the nulls of the curve in FIG. 9 are wider than the nulls of the curve shown in FIG. 3. Thus, in the presence of system nonlinearity causing the color representative carrier waves to deviate from their nominal center frequency the comb filter apparatus of FIG. 7 provides better color carrier separation because the carrier frequency can deviate more coming up out of the null.

The extra width of the nulls 66 of the curve in FIG. 9 relative to the nulls 46 of the curve shown in FIG. 3 is produced by the use of an additional 1–H delay in the comb filter apparatus shown in FIG. 7.

Those blocks of FIG. 7 performing similar functions to their respective corresponding blocks in FIGS. 1 and 4 and identified by the same numerals and a detailed description of them will not be given in conjunction with FIG. 7.

The comb filter apparatus of the system shown in FIG. 7 includes 1–H delay 31, 1–H delay 56, 180° phase shifter 57, signal combiner 32, amplifier 58, 90° phase shifter 59, 180° phase shifter 60 and a signal combiner 35.

The bandpass filtered color representative carrier waves obtained from bandpass filter 30 are coupled to 1–H delay 31 which delays the waves for one horizontal scanning interval. These delayed waves are coupled to 1–H delay 56 which delays the waves for one more horizontal line scanning interval. Thus, the waves obtained from 1–H delay 56 have been delayed for two horizontal line scanning intervals. Because of the delays provided by 1–H delays 31 and 56, the carrier waves produced during three consecutive horizontal scanning intervals appearing at the output terminals of bandpass filter 30, 1–H delay 31, and 1–H delay 56 will be in time coincidence.

Figure 8:
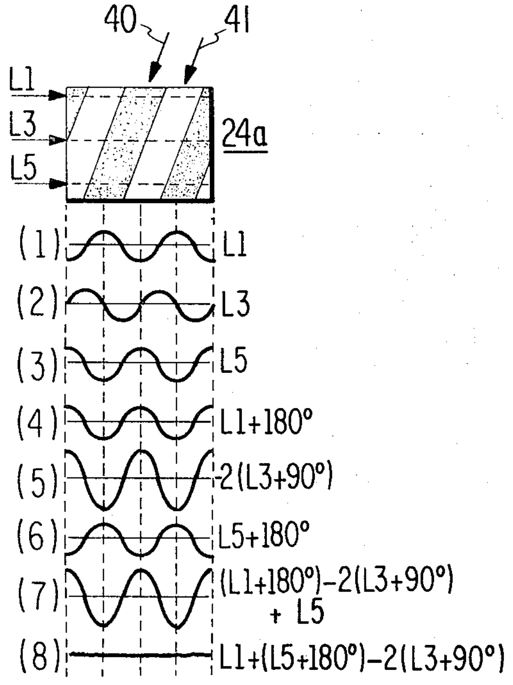
FIG. 8 is a diagram representative of a color encoding grating utilized in the system shown in FIG. 7, and waveforms obtained at various points in the system shown in FIG. 7.

The operation of the comb filter apparatus shown in FIG. 7 will be described in conjunction with FIG. 8. FIG. 8 is a diagram representative of a red color encoding grating 24a utilized in color encoding filtered assembly 24 shown in FIG. 7. FIG. 8 also shows waveforms obtained at various points in the comb filter apparatus shown in FIG. 7. Color encoding grating 24a comprises alternate cyan stripes 40 and transparent stripes 41 for encoding red light as amplitude modulation of a carrier wave having a center frequency of 4.2 MHz. FIG. 8(1) shows a waveform obtained from 1-H delay 56 which waveform has been delayed two horizontal line scanning intervals. FIG. 8(2) shows a waveform obtained from 1-H delay 31 which has been delayed for one horizontal line scanning interval. FIG. 8(3) shows a waveform obtained directly from bandpass filter 30 which is undelayed and generated during a scanning interval L5. By referring to FIGS. 8(1), 8(2) and 8(3), it can be seen that each succeeding waveform is phase shifted 90° with respect to the preceding waveform. This is caused by the scanning of the inclined stripe pairs 40–41 during three successive horizontal line scanning intervals.

The waveform shown in FIG. 8(1) is coupled to signal combiner 35 and to a 180° phase shifter 57. Phase shifter 57 delays the waveform an amount equal to 180° of a carrier wave having a 4.2 MHz center frequency. The phase shifted wave obtained from phase shifter 57 is coupled to a signal combiner 32. This phase shifted waveform is shown in FIG. 8(4). The carrier wave obtained from 1-H delay 31 and shown in FIG. 8(2) is coupled to an inverting amplifier 58 which amplifies the wave by a factor of two. This amplified wave is coupled to a 90° phase shifter 59 which delays the wave an amount equal to 90° of a carrier wave having a frequency of 4.2 MHz. This amplified and phase shifted carrier wave is coupled to signal combiner 32 and signal combiner 35. The carrier waves obtained from bandpass filter 30 are coupled to signal combiner 32 and to a 180° phase shifter 60 which delays the waves an amount equal to 180° of a 4.2 MHz carrier wave. This delayed waveform is coupled to signal combiner 35.

Having described the characteristics of the waves coupled to signal combiners 32 and 35, the signals produced by the combiners will now be described. The three red color representative carrier waves coupled to signal combiner 32, are in phase and thereby add. This waveform appears at an output terminal of signal combiner 32 and is shown in FIG. 8(7). This red representative carrier wave is amplitude detected by red signal detector 36 and the detected signal is coupled to matrix 28.

Of the three signals coupled to signal combiner 35, two of them, shown in FIGS. 8(1) and 8(6), add to produce a signal which is 180° out of phase with the third signal shown in FIG. 8(5). Thus, the three signals combine and cancel. Thereby, no red representative carrier wave is coupled to blue signal detector 37 and no red representative signal is obtained from blue signal detector 37.

Matrix 28 combines the signals applied to it to produce separate red, blue and green representative signals. The operation of the system shown in FIG. 7 for blue representative waveforms produced by a blue encoding grating of filter assembly 24 is similar to the operation described in conjunction with red encoding grating 24a of FIG. 8. For the carrier waves produced by scanning an encoded image of blue representative carrier waves, a blue representative signal will be obtained from blue signal detector 37 but not from red signal detector 36.

Figure 10:
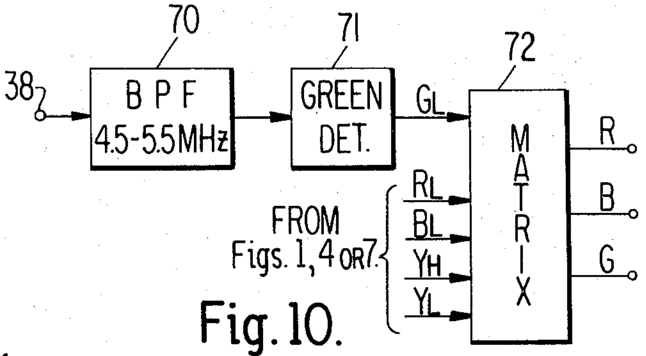
FIG. 10 is a block diagram of apparatus which may be combined with the systems shown in FIGS. 1, 4 or 7 for producing an additional encoded color representative signal.

FIG. 10 is a block diagram of apparatus which may be combined with the system shown in FIGS. 1, 4 or 7 for producing an additional encoded color representative signal. In the systems shown in FIGS. 1, 4 and 7, two colors, red and blue, are encoded and a third color, green, is obtained by matrixing the red, blue and brightness signals. In some situations in the absence of color carrier wave components a two-color encoding system will produce a false signal. A system utilizing the apparatus shown in FIG. 10 produces only a brightness representative signal in the absence of colored carrier wave components.

Figure 11:
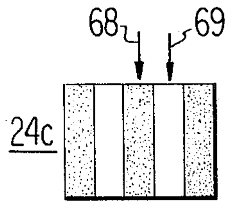
FIG. 11 is a diagram of an encoding grating which may be utilized with the apparatus shown in FIG. 10.

FIG. 11 is a diagram of an encoding grating which may be utilized with the apparatus shown in FIG. 10 and which is added to the encoding filter assembly 24 of FIGS. 1, 4 or 7 for spatially encoding green light. In FIG. 11 encoding grating 24c comprises alternate magenta stripes 68 and transparent stripes 69. The magenta stripes block green light and pass light of all other colores and the transparent stripes 69 pass light of all colors. Therefore, in the presence of green light impinging upon encoding grating 24c a spatial carrier having a frequency determined by the pitch of the stripe pair 68–69 will be produced, the carrier being amplitude modulated by the amount of green light in the scene. The pitch of stripe pairs 68–69, FIG. 11 is selected such that the green representative carrier frequency is located in a different portion of the spectrum than the interleaved red and blue carrier waves.

Figure 12:
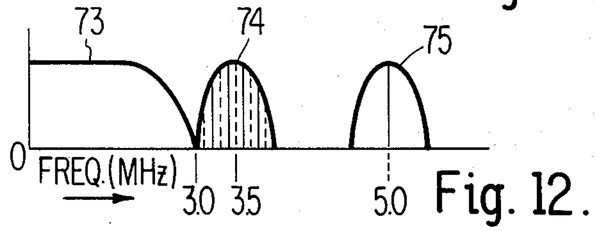
FIG. 12 is a diagram representative of the color and brightness signal spectrum utilized by the apparatus shown in FIG. 10.

Referring to FIG. 12, which is a diagram representative of the color and brightness signal spectrum utilized by the apparatus shown in FIG. 10, the green color representative carrier wave and its sidebands are represented by the curve 75. Curve 75 is centered about a frequency of 5 MHz and its sidebands extend 500 KHz above and below the carrier frequency. A curve 74 represents the spectrum of the interleaved red and blue color carrier waves and their associated sidebands. The pitch and angle of inclination of the stripes of the red and blue encoding gratings as otherwise described in conjunction with FIGS. 1, 4 and 7 is selected such that the red and blue color carriers are located at 3.5 MHz with their associated sidebands extending 500 KHz and below this center frequency. Thus, it is to be understood that bandpass filter 30 of FIGS. 1, 4 and 7 must be changed to have a bandpass of 3 to 4 MHz to operate with the apparatus shown in FIG. 10. The brightness representative signal is contained within the pass band of 0 to 3 MHz and is represented by the curve 73.

In FIG. 10 a bandpass filter 70 is coupled to a terminal 38. Terminal 38 is an output terminal of the image pickup device shown in FIGS. 1, 4 and 7. Bandpass filter 70 separates the green color carrier and its associated sidebands from the composite signal. The green representative carrier wave and sidebands obtained from bandpass filter 70 are coupled to a green signal detector 71 which amplitude demodulates the green carrier wave and sidebands. A green representative color signal obtained from green signal detector 71 is coupled to a matrix 72. Matrix 72 is substituted for matrix 28 of FIGS. 1, 4 and 7 and combines the relatively low frequency green signal components with the brightness signal components and combines the red and blue low frequency components with the brightness signal components for producing separate red, blue and green representative signals. The R, B and G signals obtained from matrix 72 are suitable for application to a standard color television signal encoder.

FIG. 11 shows a green encoding grating 24*c* comprising magneta and transparent stripes 68 and 69 disposed in a vertical direction. It should be noted that the green encoding grating 24*c* does not have to have its stripes disposed normal to the direction of scan but that the stripes may be inclined at some angle other than 90° to the direction of scan. For any given angle of inclination of encoding stripes 68 and 69 their pitch must be selected such that the desired green color carrier frequency is obtained upon scanning of the green encoded pattern on the photosensitive electrode of the image pickup device.

Figure 13:
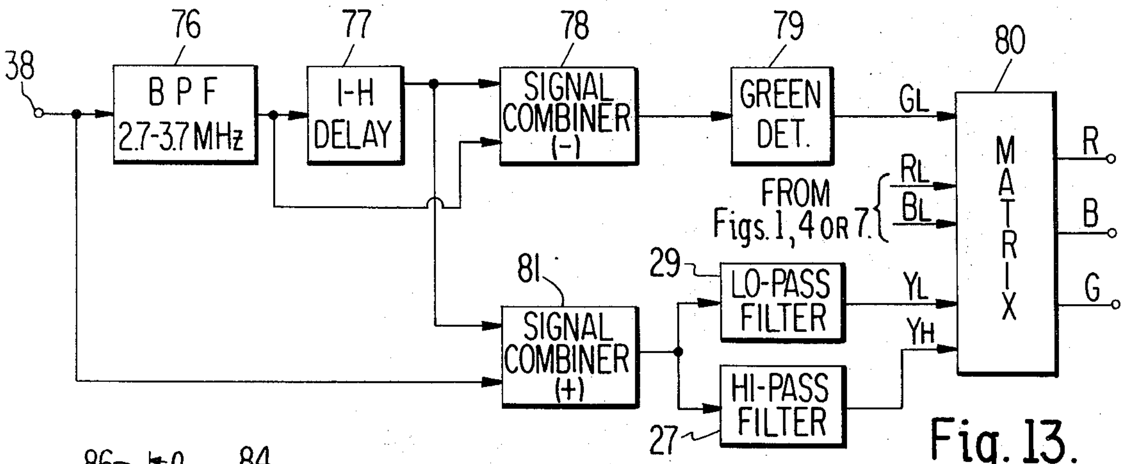
FIG. 13 is a block diagram of apparatus which may be utilized with any of the systems shown in FIGS. 1, 4 or 7 for producing an additional encoded color representative signal.

FIG. 13 is a block diagram of apparatus which may be utilized with any of the systems shown in FIGS. 1, 4 or 7 for producing an additional encoded color representative signal. As described in conjunction with FIG. 10, the purpose of producing a third color is to insure that in the absence of colored light from a scene only a brigntness representative signal is produced. The embodiment shown in FIG. 13 differs from that of FIG. 10 in that apparatus is provided for producing a third encoded color representative signal without descreasing the bandwidth of the other two color representative signals or the brightness representative signal.

Figure 14:
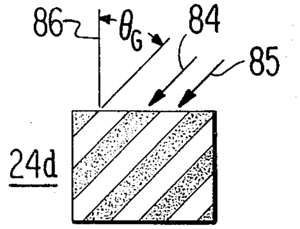
FIG. 14 is a diagram of an encoding grating utilized with the apparatus shown in FIG. 13.
Figure 15:
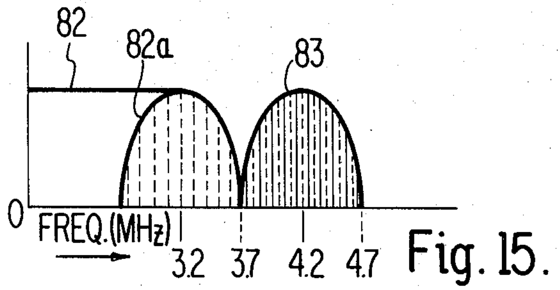
FIG. 15 is a diagram representing the color and brightness signal spectrum utilized by the apparatus shown in FIG. 13.

FIG. 14 is a diagram of a green color encoding grating utilized with the apparatus shown in FIG. 13. FIG. 15 is a diagram representing the color and brightness signal spectrum utilized by the apparatus shown in FIG. 13. In FIG. 15 curve 83 represents the spectrum utilized by the interleaved red and blue color carriers represented by the interleaved dotted and solid lines contained under the curve 83. As in the embodiment shown in FIGS. 1, 4 and 7, the red and blue color carriers are centered at a frequency of 4.2 MHz and their sidebands extend 500 KHz above and below this center frequency. Curve 82 represents the spectrum utilized by the brightness representative signals. These signals extend from 0 to 3.7 MHz. Curve 82*a* represents that portion of the spectrum utilized by both the higher frequency brightness representative signals and the green representative signals. The green representative signals are interleaved with the brightness signal components in a manner to be described in conjunction with FIG. 14 and are represented by the dotted lines contained under the curve 82*a*. The green color representative carrier wave is centered at 3.2 MHz and its sidebands extend 500 KJz above and below this center frequency.

In FIG. 14 magenta stripes 84 and transparent stripes 85 of green encoding grating 24*d* are disposed at an angle $\theta_G$ from a vertical reference line 86. Reference line 86 is normal to the direction of scan. The angle of inclination $\theta_G$ and the pitch of stripe pairs 84–85 are selected such that the green color representative carrier wave undergoes a 180° phase change on successive scanning lines and its frequency is approximately 3.2 MHz. The pitch of the stripes is selected such that the green carrier wave is at a frequency of some multiple of one-half the horizontal line scanning frequency, thereby interleaving the green and brightness signal components. Encoding grating 24*d* is sandwiched with the red and blue encoding gratings in filter assembly 24 of any of the systems shown in FIGS. 1, 4 or 7. Therefore, upon scanning, a composite signal obtained at output terminal 38 of the image pickup device contains a green representative color carrier wave and its associated sidebands as well as the red and blue representative carrier waves and sidebands and a brightness representative signal.

In FIG. 13 the composite signal obtained at terminal 38 is coupled to a bandpass filter 76 which separates the green color representative carrier wave and its sidebands from the composite signal. The green carrier wave and sidebands are coupled to a 1–H delay 77 which delays the signal for one horizontal line scanning interval. The delayed signal is coupled to a signal combiner 78 and a signal combiner 81. The composite signal obtained from terminal 38 is coupled to signal combiner 81. The band-limited composite signal obtained from bandpass filter 76 is also coupled to signal combiner 78. The blocks 77, 78 and 81 comprise a comb filter for separating the green representative signals from the composite signal. Signal combiner 78 substracts the two signals applied to it from each other. Therefore, the green signal components, being 180° out of phase on successive scanning lines and at the input terminals of combiner 78, are subtracted from each other. The resultant signal is a green representative color carrier wave and sidebands obtained at an output terminal of signal combiner 78. This green representative carrier wave is coupled to a green signal detector 79 which amplitude demodulates the carrier wave and sidebands for producing a green representative signal. The green representative signal is coupled to a matrix 80 which is substituted for matrix 28 shown in FIGS. 1, 4 and 7. The brightness representative signal components coupled to signal combiner 78 are not out of phase and are therefore substracted from each other, thereby producing no brightness component in the green signal.

Signal combiner 81 adds the signals applied to its input terminals. Since the green representative color carrier waves on successive lines are 180° out of phase, the delayed green signal and the undelayed green signal coupled to combiner 81 cancel and no green representative signal is derived from combiner 81. However, the brightness representative signals, being interleaved with the green color carrier wave components, are not cancelled and therefore are obtained from signal combiner 81. The brightness signals are coupled to low pass filter 29 and high pass filter 27 which separate the low and high frequency brightness signal components. The brightness signal components obtained from filters 27 and 29 are coupled to matrix 80. Matrix 80 is substituted for matrix 28 of FIGS. 1, 4 and 7 and combines the relatively low frequency red, green and blue signals with the brightness representative signals for producing red, blue and green color representative signals at its output terminals.

In the embodiments described, both upper and lower sidebands of the amplitude modulated color representative carrier waves are utilized for producing the color representative signals. The same information is contained in both sidebands. Therefore, if desired, the invention may be utilized in a vestigal sideband system in which only the upper or lower sideband information is utilized. The use of such a vestigal sideband system permits the carrier wave to be increased or decreased in frequency to allow a wider spectrum for the brightness representative signals or a third color representative signal without increasing the total system spectrum requirements.

The invention has been described in the various embodiments in the context of a live color television camera. As these embodiments illustrate the encoding and decoding systems will readily show the advantages of the invention over the prior art. However, the encoding apparatus and techniques described are not limited to live television camera embodiments. For example, the encoding techniques and apparatus may be utilized for encoding color information onto a black and white film in a film camera. In such an embodiment the photosensitive electrode is replaced by a black and white film and the encoded information is contained as intensity variations on the processed film. This encoded film subsequently may be scanned and the signals separated by apparatus simlar to that described above in cpnjunction with the live composite signal processing apparatus.

What is claimed is:

1. A system for producing signals representative of the color of a scene, comprising:

an image pickup device;

striped spatial color encoding filter means comprising at least first and second gratings for respectively encoding at least first and second colors, said gratings being disposed between said scene and a photosensitive electrode of said image pickup device for filtering the scene light reaching said electrode such that a composite signal representative or the color of said scene is derived from said image pickup device during scanning of said photosensitive electrode, the encoding stripes of said first and second gratings being angularly disposed relative to the stripes of each other, said stripes of both of said first and second gratings having the same pitch and the stripes of said first and second gratings being disposed at equal and opposite angles from the direction of scanning such that said scanning produces said composite signal including first and second amplitude modulated color representative carrier wave components each having the same nominal carrier freqeuncy during a scanning interval and a nominal phase shift of substantially 90° at said nominal carrier frequency between corresponding points in successive scanning intervals; an signal processing means coupled to said image pickup device for combining signals derived from a plurality of successively scanned lines to derive separately and simultaneously a first output comprising said first color representative carrier wave components to the substantial exclusion of said second color representative carrier wave components, and a second output comprising said second color representative carrier wave components to the substantial exclusion of said first color representative carrier wave components;

said signal processing means including:

1. bandpass filter means coupled to said image pickup device for separating said color representative carrier wave components from said composite signal;
2. means, having an input coupled to said bandpass filter means, for delaying said carrier wave components for a line scanning interval;
3. first signal combining means;
4. means for utilizing said first signal combining means to combine signals appearing at the input an output of said line interval delaying means in such manner that said first carrier wave components from said input and output of said line interval delaying means combine in reinforcing phase relationship in the output of said first combining means whereas said second carrier wave components from said input and output of said line interval delaying means combine in cancelling phase relationship in the output of said combining means whereby the output of said first combining means constitutes said first output of said signal processing means;
5. second signal combining means;
6. means for utilizing said second combining means to combine signals appearing at the input and output of said line interval delaying means in such manner that said second carrier wave components from said input and output of said line interval delaying means combine in reinforcing phase relationship in the output of said second combining means whereas said first carrier wave components from said input and output of said line interval delaying means combine in cancelling phase relationship in the output of said second combining means whereby the output of said second combining means constitutes said second output of said signal processing means;
7. each of said utilizing means including respective couplings (a) between said line interval delaying means output and a first input of the respective combining means, and (b) between said line interval delaying means input and a second input of the respective combining means, one of said couplings including a phase shift network for subjecting carrier wave components to a phase shift corresponding to 90° at said nominal carrier frequency.

2. A system in accordance with claim 1 for producing signals representative of the color of a scene, further comprising:

said color encoding filter means also including a third color encoding grating for encoding a third color, said third grating having a stripe pitch different from the stripe pitch of said first and second gratings such that scanning of said photosensitive electrode produces said composite signal including third color representative carrier wave components having a different carrier frequency during a scanning interval than said first and second color representative carrier wave components;

said signal processing means including second bandpass filter means coupled to said image pickup device for separating said third color representative carrier wave components from said composite signal;

means coupled to said image pickup device for producing a brightness representative signal, said stripes of said filter being selected such that the average transmission of light by said filter is representative of the brightness of said scene;

detecting means coupled to said combining means for demodulating said amplitude modulated color representative carrier waves and their associated sidebands;

additional detecting means coupled to said second bandpass filter for demodulating said third color representative carrier wave components; and matrixing means coupled to said detecting means and to said brightness representative signal producing means for combining said color and brightness representative signals for producing second singals representative of the color of a scene.

3. A system for producing signals representative of the color of a scene according to claim 1 wherein said stripes of said filter are selected such that the average transmission of light by said filter is representative of the brightness of said scene; said system also including:

means coupled to said image pickup device for producing brightness representative signals; and means coupled to said producing means for limiting said brightness representative signals to frequencies below said nominal carrier frequency.

4. A system according to claim 3 wherein:

detecting means are coupled to said combining means for demodulating said amplitude modulated color representative carrier waves and their associated sidebands; and matrixing means are coupled to said detecting means and to said frequency limiting means for combining said frequency limited brightness representative signals and the outputs of said detecting means for producing second signals representative of the color of a scene.

5. A system for producing signals representative of the color of a scene, comprising:

an image pickup device;

striped spatial color encoding filter means comprising first, second, and third gratings for encoding first, second, and third colors, respectively, said gratings being disposed between said scene and a photosensitive electrode of said image pickup device for filtering the scene light reaching said electrode such that a composite signal representative of the color of said scene is derived from said image pickup device during scanning of said photosensitive electrode, the encoding stripes of said first and second gratings being angularly disposed relative to the stripes of each other, said stripes of both of said first and second gratings having the same pitch and the stripes of said first and second gratings being disposed at equal and opposite angles from the direction of scanning such that said scanning produces said composite signal including first and second amplitude modulated color representative carrier wave components each having the same nominal carrier frequency during a scanning internal and a nominal phase shift of substantially 90° at said nominal carrier frequency between corresponding points in successive scanning intervals;

said stripes of said third grating having the stripe width selected and the angle of inclination of the stripes of said third grating so disposed such that the width of each of the stripes of said third grating in the direction of scan is different than the width of the stripes of said first and second gratings such that said scanning of the encoded image on said photosensitive medium produces third amplitude modulated color representative carrier wave components having a different nominal carrier frequency during a scanning interval than said first and second color representative carrier wave components;

first bandpass filter means coupled to said image pickup device for separating said first and second color representative carrier wave components from said composite signal;

means, having an input coupled to said first bandpass filter means, for delaying said first and second carrier wave components for a line scanning interval;

first signal combining means;

means for utilizing said first signal combining means to combine signals appearing at the input and output of said line interval delaying means in such manner that said first carrier wave components from said input and output of said line interval delaying means combine in reinforcing phase relationship in the output of said combining means whereas said second carrier wave components from said input and output of said line interval delaying means combine in cancelling phase relationship in the output of said first combining means;

second signal combining means;

means for utilizing said second combining means to combine signals appearing at the input and output of said line interval delaying means in such manner that said second carrier wave components from said input and output of said line interval delaying means combine in reinforcing phase relationship in the output of said second combining means whereas said first carrier wave components from said input and output of said line interval delaying means combine in cancelling phase relationship in the output of said second combining means;

each of said utilizing means including respective couplings (a) between said line interval delaying means output and a first input of the respective combining means, and (b) between said line interval delaying means input and a second input of the respective combining means, one of said couplings including a phase shift network for subjecting carrier wave components to a phase shift corresponding to 90° at said nominal carrier frequency;

second bandpass filter means coupled to said image pickup device for separating said third color representative carrier wave components from said composite signal.

6. Apparatus in accordance with claim 5 wherein said different nominal carrier frequency resulting from scanning of said third grating is higher in frequency than said nominal carrier frequency resulting from scanning said first and second gratings, and wherein the stripes of said filter gratings are selected such that the average transmission of light by said filter is representative of the brightness of said scene, said apparatus also including:

means coupled to said image pickup device for deriving brightness representative signals therefrom;

means coupled to said brightness representative signal deriving means for limiting said brightness representative signals to frequencies below both of said nominal carrier frequencies;

first and second detecting means respectively responsive to the outputs of said first and second combining means for demodulating said first and second amplitude modulated color representative carrier wave components;

third detecting means responsive to the output of said second bandpass filter means for demodulating said third amplitude modulated color representative carrier wave components; and output signal deriving means responsive to said frequency limited brightness representative signals and the outputs of said first, second and third detecting means.

7. Apparatus in accordance with claim 5 wherein said different nominal carrier frequency resulting from scanning of said third grating is lower in frequency than said nominal carrier frequency resulting from scanning said first and second gratings, wherein the stripe pitch and inclination of said third grating is such as to produce said third carrier wave components at said different nominal carrier frequency with a nominal phase shift of 180° at said different nominal carrier frequency between corresponding points in successive scanning intervals, and wherein the stripes of said filter gratings are selected such that the average transmission of light by said filter is representative of the brightness of said scene and said composite signal contains brightness representative signals, said apparatus also including;

first and second detecting means respectively responsive to the outputs of said first and second combining means for demodulating said first and second amplitude modulated color representative carrier wave components; comb filter means responsive to the output of said second bandpass filter means for passing said third amplitude modulated color representative carrier wave components to the substantial exclusion of components of said brightness representative signals falling within the passband of said second bandpass filter means;

third detecting means responsive to the output of said comb filter means for demodulating said third amplitude modulated color representative carrier wave components;

means for deriving brightness representative signals, occupying a frequency band extending up to a frequency intermediate said nominal carrier frequencies, from said image pickup device; said deriving means including additional comb filter means responsive to the output of said second bandpass filter means for passing components of said brightness representative signals to the substantial exclusion of said third modulated color representative carrier wave components; and output signal deriving means responsive to said brightness representative signals and the outputs of said first, second and third detecting means.

8. A system for producing signals representative of the color of a scene, comprising:

an image pickup device;

striped spatial color encoding filter means comprising at least first and second gratings for encoding at least first and second colors, said gratings being disposed between said scene and a photosensitive electrode of said image pickup device for filtering the scene light reaching said electrode such that a composite signal representative of the color of said scene is derived from said image pickup device during scanning of said photosensitive electrode, the encoding stripes of first and second of said gratings being angularly disposed relative to the stripes of each other, said stripes of both of said first and second gratings having substantially the same pitch and the stripes of said first and second gratings being disposed at equal and opposite angles from the direction of scanning such that said scanning produces said composite signal including first and second amplitude modulated color representative carrier wave components each having the same nominal carrier frequency during a scanning interval and a nominal phase shift of 90° at said nominal carrier frequency between corresponding points in successive scanning intervals;

bandpass filter means coupled to said image pickup device for separating said color representative carrier wave components from said composite signal;

delay means coupled to said bandpass filter means for delaying said carrier wave components for one line scanning interval;

inverting means coupled to said bandpass filter means for inverting the polarity of said carrier wave components;

first phase shifting means coupled to said delay means for subjecting said delayed carrier wave components to a phase shift of 90° at said nominal carrier frequency;

first combining means coupled to said first phase shifting means and to said inverting means for combining the carrier wave components obtained from said first phase shifting means and from said inverting means for producing first separated color representative carrier wave components;

second phase shifting means coupled to said inverting means for subjecting said inverted carrier wave components to a phase shift of 90° at said nominal carrier frequency; and second combining means coupled to said delay means and to said second phase shifting means for combining the carrier wave components obtained from said delay means and from said second phase shifting means for producing second separated color representative carrier wave components.

9. A system for producing signals representative of a scene according to claim 8 including detecting means coupled to said first and second signal combiners for demodulating said first and second separated color representative carrier wave components.

10. A system for producing signals representative of a scene according to claim 9 wherein:

said stripes of said color encoding gratings are selected such that the average transmission of light by said filter means corresponds to the brightness of said scene, and said composite signal contains a brightness representative signal;

brightness signal filter means are coupled to said image pickup device for separating said brightness representative signals from said composite signal; and matrixing means are coupled to said detecting means and to said brightness signal filter means for combining the signals obtained therefrom for producing a plurality of separate color representative signals.

11. A system for producing signals representative of the color of a scene, comprising:
- an image pickup device;
- striped spatial color encoding filter means comprising at least first and second gratings for encoding at least first and second colors, said gratings being disposed between said scene and a photosensitive electrode of said image pickup device for filtering the scene light reaching said electrode such that a composite signal representative of the color of said scene is derived from said image pickup device during scanning of said photosensitive electrode,
- the encoding stripes of first and second of said gratings being angularly disposed relative to the stripes of each other, said stripes of both of said first and second gratings being disposed at equal and opposite angles from the direction of scanning such that said scanning produces said composite signal including first and second amplitude modulated color representative carrier wave components having substantially the same frequency during a scanning interval;
- bandpass filter means coupled to said image pickup device for separating said color representative carrier wave components from said composite signal;
- first and second delay means serially coupled to said bandpass filter means for producing, respectively, first and second delayed carrier wave components, the delay of each of said first and second delay means being substantially equal to one line scanning interval;
- third delay means coupled to said second delay means for delaying said second delayed carrier wave components for a first portion of the period of said carrier waves;
- inverting amplifier means coupled to said first delay means for inverting said first delayed carrier wave components;
- four delay means coupled to said inverting amplifier means for delaying said inverted carrier wave components for a second portion of the period of said carrier waves;
- fifth delay means coupled to said bandpass filter means for delaying said carrier wave components for a first portion of the period of said carrier waves;
- first signal combiner means coupled to said third, fourth, and fifth delay means for combining the carrier wave components obtained therefrom for producing first separated color representative carrier wave components; and
- second signal combiner means coupled to said second, fourth and fifth delay means for combining the carrier wave components obtained therefrom for producing second separated color representative carrier wave components.

12. A system for producing signals representative of a scene according to claim 11 including detecting means coupled to said first and second signal combiners for demodulating said first and second separated color representative carrier wave components.

13. A system for producing signals representative of a scene according to claim 12 wherein:
- said stripes of said color encoding gratings are selected such that the average transmissivity of said filter means contains a brightness representative signal;
- brightness signal bandpass filter means are coupled to said image pickup device for separating said brightness representative signals from said composite signal; and
- matrixing means are coupled to said detecting means and to said brightness signal bandpass filter means for combining the signals obtained therefrom for producing a plurality of separate color representative signals.

14. A system for encoding a plurality of colors, comprising:
- a photosensitive medium;
- a stripped spatial color encoding filter assembly disposed between an object and said photosensitive medium for spatially encoding colored light from said object onto said photosensitive medium, said filter assembly including;
- first and second superimposed encoding gratings each having a pattern of stripes of material for encoding a respectively different one of first and second colors as amplitude modulation of a spatial carrier frequency, said stripes of both of said gratings having the same pitch and said stripes of each of said gratings disposed at substantially equal and opposite angles from a common reference line such that subsequent scanning of the encoded image on said photosensitive medium in a direction normal to said reference line produces first and second amplitude moduated carrier wave components each having substantially the same nominal carrier frequency during a scanning interval and a nominal phase shift of 90° at said nominal carrier frequency between corresponding points in successive scanning intervals;
- means for scanning said photosensitive medium in said direction normal to said reference line; and
- signal processing means including comb filter means responsive to the scanning of said photosensitive medium for separating said first and second carrier wave components for producing separated signals representative of light of respectively different ones of said first and second colors;
- said comb filter means including:
  1. means for delaying said carrier wave components for a line scanning interval;
  2. signal combining means;
  3. means for utilizing said signal combining means to combine signals appearing at the input and output of said line interval delaying means in such manner that said first carrier wave components from said input and output of said line interval delaying means combine in reinforcing phase relationship in the output of said combining means whereas said second carrier wave components from said input and output of said line interval delaying means combine in canceling phase relationship in the output of said combining means;
  4. additional signal combining means;
  5. means for utilizing said additional combining means to combine signals appearing at the input and output of said line interval delaying means in such manner that said second carrier wave components from said input and output of said line interval delaying means combine in reinforcing phase relationship in the output of said additional combining means whereas said first carrier wave components from said input and output of said line interval delaying means combine in canceling phase relationship in the output of said additional combining means;

6. each of said utilizing means including respective couplings (a) between said line interval delaying means output and a first input of the respective combining means, and (b) between said line interval delaying means input and a second input of the respective combining means, one of said couplings including a phase shift network for subjecting carrier wave components to a phase shift corresponding to 90° at said nominal carrier frequency.

* * * * *